US012264506B2

(12) United States Patent
Geraci

(10) Patent No.: US 12,264,506 B2
(45) Date of Patent: Apr. 1, 2025

(54) EXIT DEVICE ROD ADJUSTMENT

(71) Applicant: ASSA ABLOY Access and Egress Hardware Group, Inc., New Haven, CT (US)

(72) Inventor: Andrew S. Geraci, Wallingford, CT (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 37 days.

(21) Appl. No.: 17/478,535

(22) Filed: Sep. 17, 2021

(65) Prior Publication Data

US 2022/0112746 A1 Apr. 14, 2022

Related U.S. Application Data

(60) Provisional application No. 63/089,616, filed on Oct. 9, 2020.

(51) Int. Cl.
*E05B 65/10* (2006.01)
*E05B 53/00* (2006.01)
*E05B 63/20* (2006.01)

(52) U.S. Cl.
CPC ........ *E05B 65/1006* (2013.01); *E05B 53/008* (2013.01); *E05B 63/20* (2013.01)

(58) Field of Classification Search
CPC ......... Y10T 292/0908; Y10T 292/0909; Y10T 292/091; Y10T 292/0846; Y10T 292/086; E05B 65/1006; E05B 53/008; E05B 63/20; Y10S 292/60
USPC ........................................ 248/221.11, 222.11
See application file for complete search history.

(56) References Cited

U.S. PATENT DOCUMENTS 1,033,057 A * 7/1912 Teich .................. E05B 65/1006 292/21
2,147,581 A * 2/1939 Prinzler .............. E05B 65/1066 70/92
3,264,019 A * 8/1966 Houvener et al. ......... F16B 7/18 403/8
3,578,369 A * 5/1971 Coopersmith ............ E05C 7/06 292/62

(Continued)

FOREIGN PATENT DOCUMENTS

DE 1940732 A1 * 8/1969 ......... E05B 63/0056
DE 3829030 A * 3/1989 .............. F16B 31/02

(Continued)

*Primary Examiner* — Kristina R Fulton
*Assistant Examiner* — Steven A Tullia
(74) *Attorney, Agent, or Firm* — Wolf, Greenfield & Sacks, P.C.

(57) ABSTRACT

A latching device may include an actuator configured to actuate between an actuated state and an unactuated state, a first rod including a threaded end, and a first rod coupler operatively coupled to the actuator and the first rod and configured to transfer force between the actuator and the first rod. The first rod coupler may include a rod receptacle configured to rotate about a first axis and to at least partially receive and engaged the first rod. The first rod coupler may also include a rod adjuster rotatably coupled to the rod receptacle and configured to rotate about a second axis to rotate the rod receptacle about the first axis. The rotation of the rod receptacle may change the position of the first rod relative to the actuator.

25 Claims, 11 Drawing Sheets

(56) References Cited

U.S. PATENT DOCUMENTS 4,116,479 A * 9/1978 Poe .................. E05C 19/145 292/DIG. 60
4,478,446 A * 10/1984 Duran .................. E05B 15/025 292/113
4,601,499 A * 7/1986 Kim .................. E05C 9/20 292/DIG. 60
4,685,848 A * 8/1987 Langer .................. B25B 17/00 411/407
4,691,951 A * 9/1987 Fildan .................. E05C 1/163 292/DIG. 60
4,852,923 A * 8/1989 Harmon .................. E05B 15/025 292/DIG. 60
4,869,614 A * 9/1989 Fisher .................. F16B 12/2063 403/231
4,881,765 A * 11/1989 Heid .................. E05C 9/20 292/DIG. 60
4,906,037 A * 3/1990 Stammreich .................. F16H 35/10 292/DIG. 60
4,941,695 A * 7/1990 Miller .................. F16J 13/24 292/259 R
5,016,931 A * 5/1991 Jackson .................. E05B 15/025 411/7
5,042,851 A * 8/1991 Hunt .................. E05C 9/20 292/DIG. 60
5,154,454 A * 10/1992 Hollaway .................. E05B 65/1046 292/DIG. 60
5,226,302 A * 7/1993 Anderson .................. E05B 15/022 292/DIG. 60
6,134,986 A * 10/2000 Durrani .................. B62D 1/10 74/552
6,382,690 B1 * 5/2002 Dessenberger, Jr. ... E05B 41/00 292/113
6,820,905 B1 * 11/2004 Haeck .................. E05B 65/1013 70/92
6,890,121 B2 * 5/2005 Mauri .................. F16B 12/2063 403/231
7,004,455 B2 * 2/2006 Pilja .................. F16B 23/0061 254/13
7,500,412 B1 * 3/2009 Maciejewski .................. B25B 13/48 74/424.71
7,748,757 B2 * 7/2010 Shen .................. E05B 65/1006 70/92
8,162,561 B2 * 4/2012 Pilja .................. F16B 12/2063 403/DIG. 12
9,428,940 B1 8/2016 Patrick
10,094,142 B2 * 10/2018 Kondi .................. E05B 63/06
11,377,887 B2 * 7/2022 Cote .................. E05C 9/22
11,624,204 B2 * 4/2023 Schaeffer .................. E05C 9/1875 292/109
11,946,299 B2 * 4/2024 Geraci .................. E05C 9/22
2007/0252318 A1 * 11/2007 Dorney .................. F16B 37/045 269/165
2008/0256995 A1 * 10/2008 Lin .................. E05B 65/1006 70/92
2008/0266761 A1 * 10/2008 Robinson .................. G01R 11/04 361/672
2009/0139283 A1 * 6/2009 Peng .................. E05B 65/1013 70/92
2010/0066101 A1 * 3/2010 Shen .................. E05B 65/1006 292/21
2010/0066102 A1 * 3/2010 Shen .................. E05B 65/1006 292/92
2010/0117376 A1 * 5/2010 Shen .................. E05B 65/1006 292/92
2011/0192201 A1 * 8/2011 Lin .................. E05B 53/00 70/92
2012/0000257 A1 * 1/2012 Wheeler .................. E05B 63/0013 70/91
2013/0093195 A1 * 4/2013 Tien .................. E05B 65/104 292/93
2013/0127184 A1 * 5/2013 Tien .................. E05B 65/104 292/219
2014/0102155 A1 * 4/2014 Lin .................. E05C 9/046 70/92
2015/0308155 A1 * 10/2015 Eller .................. E05B 47/0012 292/143
2016/0002963 A1 * 1/2016 Kondi .................. E05B 63/185 292/5
2016/0153218 A1 * 6/2016 Kondi .................. E05B 63/06 292/138
2016/0208525 A1 * 7/2016 Arlinghaus .................. E05B 65/1006
2017/0081882 A1 * 3/2017 Lin .................. E05B 65/1006
2017/0292293 A1 * 10/2017 Lin .................. E05C 3/16
2019/0211583 A1 * 7/2019 Capozziello .................. E05B 63/0056
2019/0316404 A1 * 10/2019 Rotondi .................. E06B 3/36
2020/0040602 A1 * 2/2020 Lin .................. E05C 19/028
2021/0388648 A1 * 12/2021 Geraci .................. E05C 9/22
2022/0112746 A1 * 4/2022 Geraci .................. E05B 63/20
2024/0218716 A1 * 7/2024 Geraci .................. E05B 63/20

FOREIGN PATENT DOCUMENTS

DE 202009008430 U1 * 9/2009 .................. E05B 15/04
DE 102012011011 A1 * 12/2013 .................. E05B 3/06
DE 102014104124 A1 * 10/2015 .................. E05B 15/102
EP 0874118 A2 * 4/1998
EP 1524390 A2 * 4/2005 .................. E05B 65/1013
EP 1659250 A1 * 5/2006 .................. E05C 9/08
EP 1798424 A1 * 6/2007 .................. F16B 12/2063
EP 1659250 B1 * 7/2009 .................. E05B 9/08
EP 3153716 A1 * 4/2017 .................. A47B 91/022
EP 4159961 A1 * 4/2023 .................. E05B 65/1006
ES 2316224 A1 * 4/2009 .................. E05B 65/1006
FR 2620181 A1 * 3/1989 .................. E05B 9/00
GB 2201724 A * 9/1988 .................. E05B 15/025
GB 2503659 A * 1/2014 .................. E05B 63/042
TW M453711 U * 11/2012 .................. E05B 17/2034
WO WO-2010109068 A1 * 9/2010 .................. E05B 9/00
WO WO-2013178690 A1 * 12/2013 .................. E05C 3/06
WO WO-2017001425 A1 * 1/2017 .................. F16B 12/20
WO WO-2018007315 A1 * 1/2018 .................. F16B 12/20
WO WO-2021048881 A1 * 3/2021 .................. E05B 63/0056

* cited by examiner

EXIT DEVICE ROD ADJUSTMENT

RELATED APPLICATIONS

This application claims the benefit of priority under 35 U.S.C. § 119(e) of U.S. Provisional Application Ser. No. 63/089,616, filed Oct. 9, 2020, the disclosure of which is incorporated herein by reference in its entirety.

FIELD

Disclosed embodiments are related to exit device rod adjustment mechanisms and related methods of use.

BACKGROUND

Vertical rod multi-point latching devices are traditionally used to secure a door at multiple latching points. Depending on the particular application, the vertical rods may be concealed inside of the door or attached to the outside of an interior surface of the door. An exit device may include a push bar configured to retract one or more latches associated the exit device when the push bar is depressed.

SUMMARY

In some embodiments, a rod coupler includes a rod receptacle configured to rotate about a first axis, where the rod receptacle is configured to receive a rod, and where the rod receptacle includes an internal thread. The rod coupler also includes a rod adjuster rotatably coupled to the rod receptacle and configured to rotate about a second axis, where rotation of the rod adjuster about the second axis is configured to rotate the rod receptacle about the first axis.

In some embodiments, a latching device includes an actuator configured to actuate between an actuated state and an unactuated state, a first rod including a threaded end, and a first rod coupler operatively coupled to the actuator and the first rod and configured to transfer force between the actuator and the first rod. The first rod coupler includes a rod receptacle configured to rotate about a first axis, where the rod receptacle is configured to at least partially receive the first rod, and where the rod receptacle includes an internal thread threadedly engaged with the threaded end of the first rod. The first rod coupler also includes a rod adjuster rotatably coupled to the rod receptacle and configured to rotate about a second axis, where rotation of the rod adjuster about the second axis is configured to rotate the rod receptacle about the first axis.

In some embodiments, a method of installing a latching device includes rotating a rod adjuster about a rod adjuster axis in a first rotational direction to correspondingly rotate a rod receptacle about a rod receptacle axis in a second rotational direction, where the first rotational direction and second rotational direction are different, threading a threaded end of a rod into the rod receptacle when the rod receptacle is rotated in the second rotational direction, rotating the rod adjuster about the rod adjuster axis in a third rotational direction to correspondingly rotate the rod receptacle about the rod receptacle axis in a fourth rotational direction, and unthreading the threaded end of the rod from the rod receptacle when the rod receptacle is rotated in the fourth rotational direction.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
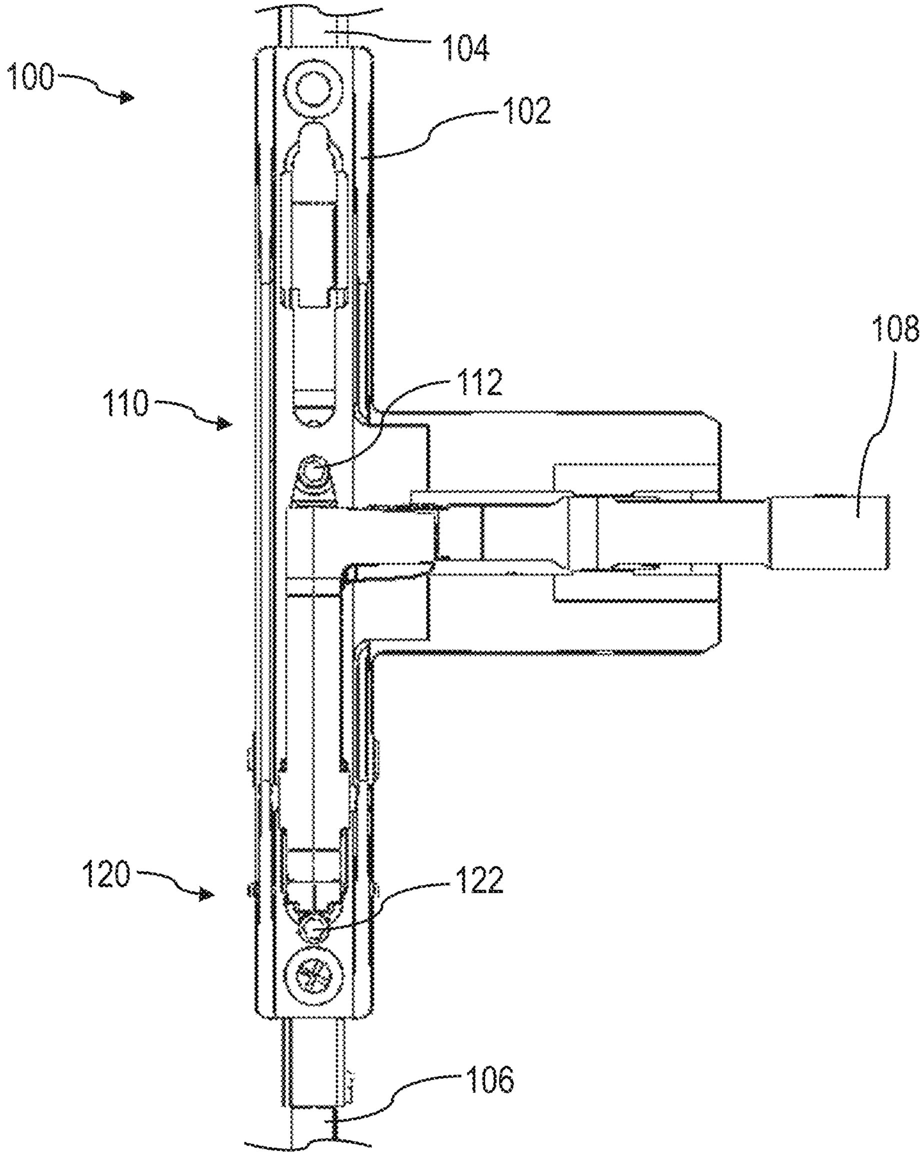
FIG. 1 is a is a side view of one embodiment of a multi-point latching device rod actuator.

Conventional multi-point latching devices are employed in doors to provide additional security or strength. These conventional multi-point latching devices oftentimes employ vertical rods or tethers linked to a central actuator by which a user can operate multiple latches with the same actuator. The vertical rods may be attached to an exterior door surface, an interior door surface, or may be concealed inside of the door. In some cases, a multi-point latching device may include a transom latch, a jamb latch, and a threshold latch providing three-point fastening for the door. In some conventional multi-point devices, rods for actuating the various latches are concealed in the door and may accordingly be difficult to access for installation or normal maintenance. Many rod-based actuators require that an operator fully remove a door from a doorway to be able to adjust the position of vertical rods for installation or maintenance. Such installation and maintenance processes may be time consuming and may leave a doorway in an unsecurable state while the rods are installed and/or adjusted.

In view of the above, the inventors have recognized the benefits of a vertical rod adjustment device which allows the relative position of concealed rods to be adjusted from a central actuator. Such an arrangement may allow a vertical rod multi-point latching device to be adjusted in a door frame without removing the door, or otherwise simplify installation and adjustment of a vertical rod latching device.

In some embodiments, a latching device may include an actuator. The actuator may be configured to actuate between an unactuated state and an actuated state. As the actuator is actuated to the actuated state, one or more associated latches (e.g., a transom latch, side latch, and/or bottom latch) may be moved from an extended position (e.g., a locked position) to a retracted position (e.g., a unlocked position). In some embodiments, the actuator may be operatively coupled to one or more rods (e.g., vertical rods). In some embodiments, actuating the actuator from the unactuated state to the actuated state may include rotating a lever of the actuator between multiple rotational positions. The actuator may include a transmission that converts the rotational movement of the lever to translational motion of the one or more rods. The one or more rods may be coupled to the actuator with one or more respective rod couplers, so that the one or more rods may be moved when the actuator is actuated to the actuated state. In some embodiments, actuating the actuator to the actuated state may move the one or more rods toward the actuator so that the one or more rods may apply tension to one or more respective latches. Accordingly, actuation of the actuator may allow the one or more rods to retract the one or more respective latches. In other embodiments the one or more rods may be moved away from the actuator when the actuator is actuated so that the one or more rods may apply compression to the one or more respective latches, as the present disclosure is not so limited.

In some embodiments, a rod coupler may be configured to allow the position of a rod relative to an actuator be adjusted at a location near the actuator. In this regard, the rod coupler may allow the position of a rod to be adjusted while the rod and actuator are already installed in a door. In some embodiments, a rod coupler includes a housing which supports a rod receptacle and a rod adjuster (e.g., a screw, bolt, bushing, shaft, etc.). The rod receptacle may be configured to rotate about a rod receptacle axis (e.g., a first axis) and the rod adjuster may be configured to rotate about a rod adjuster axis (e.g., second axis). The rod receptacle may be configured to at least partially receive a rod. The rod receptacle may also include internal threads configured to receive a threaded end of a rod. An opening configured to allow a rod to enter the rod receptacle may be positioned on a first end of the rod receptacle. A transmission may operatively couple the rod receptacle to the rod adjuster, such that rotation of the rod adjuster rotates the rod receptacle. For example, in some embodiments, a second, opposite end of the rod receptacle may include a plurality of rod receptacle gear teeth. According to this embodiment, the housing may also rotatably support the rod adjuster, which may include a plurality of rod adjuster gears at least partially engaged with the rod receptacle gears. Accordingly, rotation of the rod adjuster about the rod adjuster axis may correspondingly rotate the rod receptacle about the rod receptacle axis. As a rod may be threadedly engaged with the rod receptacle, this rotation may correspondingly thread or unthread the rod relative to the rod receptacle. Accordingly, the position of the rod may be moved relative to the rod coupler (e.g., into the rod coupler or out of the rod coupler) and correspondingly the rod coupler may be moved relative to the actuator. The rod adjuster may be accessible from a location proximate the actuator, so that the position of the rod may be adjusted while the rod is already concealed within a door.

In some embodiments, a latching device includes an actuator, a transom latch, and a bottom latch. The actuator of the latching device may be actuated by an exit device push bar, handle, or other suitable interface. The actuator may be operatively coupled to the transom latch and the bottom latch so that the transom latch and bottom latch may be operated (e.g., moved from an extended position to a retracted position) concurrently by a single actuation of the actuator. Accordingly, in some embodiments, the actuator may be connected to the transom latch by a first (e.g., upper) vertical rod and to the bottom latch by a second (e.g., lower) vertical rod. The first rod and second rod may be configured to move (e.g., linearly) along a first axis and a second axis, respectively. Accordingly, when the actuator is operated by a user, the first rod and second rod may be moved along their respective axes to operate the transom latch and bottom latch.

In some cases, a relative position of a first rod and a second rod (e.g., vertical rods) of a multi-point latching device may affect the operability of the multi-point latching device. For example, if a rod is misadjusted with an actuator of a multi-point latching device, an associated latch operated by the rod may project too far, not enough, or otherwise inhibit successful, repeatable operation of the multi-point latching device. Conventionally, rods of a multi-point latching device are carefully adjusted by an operator installing or maintaining the multi-point latching device using a combination of set screws and threaded rod couplings which require the user to loosen and tighten hard to reach fasteners multiple times before appropriate positioning of the rods is reached. Furthermore, these traditional systems for adjustment are inaccessible when a door is hung in a door frame. According to exemplary embodiments herein, operation of a rod coupler accessible at the actuator of the multi-point latching device may move a rod operatively coupled to the vertical rod coupler relative to the actuator. For example, in some embodiments, operation of a rod coupler (e.g., with a tool) may thread or unthread a rod from the rod coupler by rotation of a rod receptacle, thereby adjusting the position of the rod relative to the actuator.

In some embodiments, a method of installing and/or adjusting a latching device includes rotating a rod adjuster about a rod adjuster axis. Rotating the rod adjuster may include engaging the rod adjuster with a tool (e.g., a hex key, screwdriver, or another suitable driver). The rod adjuster may be rotated in a first rotational direction about the rod adjuster axis. Rotation of the rod adjuster may correspondingly rotate a rod receptacle about a rod receptacle axis in a second rotational direction. In some embodiments, a transmission may operatively couple the rod receptacle and the rod adjuster, such that rotation of the rod adjuster correspondingly rotates the rod receptacle. In one such embodiment, one or more rod adjuster gear teeth may be engaged with one or more rod receptacle gear teeth, so that rotation of the rod adjuster results in corresponding rotation of the rod receptacle. The rod adjuster may be accessible from a location proximate an actuator of the latching device. Accordingly, the rotation of the rod adjuster may be performed while one or more rods of the latching device are disposed within a door.

The method of installing and/or adjusting the latching device may also include threading a threaded end of a rod into the rod receptacle when the rod receptacle is rotated in the second direction. By threading the rod into the rod receptacle, the rod may be moved toward an actuator of the latching device. In some embodiments, the method may also include rotating the rod adjuster in a third rotational direction about the rod adjuster axis opposite the first direction. Correspondingly, the rod receptacle may be rotated in a fourth rotational direction opposite the second direction. As a result, the rod may be unthreaded from the rod receptacle, meaning the rod is moved away from the rod receptacle. In this manner, a rod coupler according to exemplary embodiment herein may enable relative positioning between a rod and an actuator while the rod and actuator are installed at least partially inside of a door. In some embodiments, a rod adjuster may be rotated in a single direction to correspondingly rotate the rod receptacle in a single direction to adjust the position of the rod relative to the rod receptacle. For example, in some embodiments the rod adjuster may be rotated only in the first rotational direction to rotate the rod receptacle in the second rotational direction. As another example, in some embodiments the rod adjuster may be rotated solely in the third rotational direction to rotate the rod receptacle in the fourth rotational direction.

According to exemplary embodiments described herein, a rod coupler may include a rod receptacle configured to rotate about a rod receptacle axis, and a rod adjuster configured to rotate about a rod adjuster axis. In some embodiments, the rod receptacle axis and rod adjuster axis may be transverse (e.g., perpendicular) to one another. As discussed previously, the rod adjuster and rod receptacle may be coupled to one another such that rotation of the rod adjuster about the rod adjuster axis rotates the rod receptacle about the rod receptacle axis. Accordingly, rotation of the rod adjuster may transfer to rotation of the rod receptacle about a different axis. In this manner, a rod adjuster may be more accessible for rotation by a user when a latching device is installed in a door. For example, in some embodiments, the rod receptacle axis may be parallel to a vertical axis (e.g., extend in a vertical direction), and the rod adjuster axis may be parallel to a horizontal axis (e.g., extend in a horizontal direction). Accordingly, for a door aligned in a vertical plane, the rod adjuster may be accessible to a tool in a direction perpendicular to a plane of the door (e.g., extending out of the face of the door), whereas the rod receptacle may only be accessible from a top or bottom edge of a door. The rod adjuster may therefore be readily rotated by a user while the rod coupler is positioned in a door, as the tool engaging the rod adjuster can engage the rod coupler through a thickness of the door, rather than manipulating tools or rods at a top edge or bottom edge of the door, which may be blocked by the ground or transom, respectively.

According to exemplary embodiments described herein, a latching device including an actuator and one or more rod couplers may include an auxiliary interface device positioned on an exterior side of an associated door that allows a user to operate the latching device. For example, an auxiliary interface device may be a handle, knob, keyhole, keypad, etc. positioned on an exterior side of the door. The auxiliary interface device may be operable by a user to actuate an actuator of the latching device from an unactuated state to an actuated state. In some cases, an auxiliary device may be located at a different vertical location on the door relative to an actuator. Accordingly, in some embodiments, a latching device may include an auxiliary rod operatively coupled to the actuator via a rod coupler. In some embodiments, a rod coupler may include a slot configured to receive a flange of the auxiliary rod, so that movement (e.g., vertical movement) of the auxiliary rod correspondingly moves the rod coupler in the same direction. The rod coupler may be positioned in the same place relative to the actuator regardless of the position of any associated vertical rods coupled to one or more latches. Accordingly, a specifically sized auxiliary rod may be employed for a particular auxiliary interface device without adjustment of the auxiliary rod relative to the actuator. In this manner, installation of a latching device including an auxiliary device may be simplified relative to a latching device where an auxiliary rod is individually adjusted.

It should be noted that exemplary embodiments described herein may be employed in any suitable rod actuated latching device having any suitable number of latches, including transom latches, side latches, and/or bottom latches. Additionally, a vertical rod coupler may be employed in a lock having a single concealed rod or multiple concealed rods, as the present disclosure is not so limited. A rod coupler may also be employed with locks actuated by exit device push bars, handles, deadbolt handles, and/or any other suitable actuator that may be operated by a user. Additionally, in some embodiments, the rod coupler may be employed with horizontal rods, inclined rods, or rods in any desirable orientation, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a is a side view of one embodiment of a latching device rod actuator 100. As shown in FIG. 1, the actuator includes a housing 102, which houses the various components of the actuator. The actuator may be configured to be installed at least partially inside a door. As shown in FIG. 1, the actuator is configured to move a first rod 104 and a second rod 106 between extended and retracted position. In this regard, the actuator 100 is configured to move the first rod 104 between a first vertical position and a second vertical position when the actuator is actuated between an unactuated state and an actuated state. Likewise, the actuator is configured to move the second rod 106 between a third vertical position and a fourth vertical position. As shown in FIG. 1, the actuator 100 includes a lever 108 configured to rotate between a first rotational position and a second rotational position. The lever 108 is configured to be engaged by a push bar, such that when a user depresses the push bar, the lever 108 is rotated from the first rotational position to the second rotational position to correspondingly actuate the actuator to the actuated state. The rotation of the lever 108 is transferred to translational motion of the first rod 104 and the second rod 106 through a transmission (for example, see FIG. 2).

According to the embodiment of FIG. 1, the actuator 100 is coupled to a first rod coupler 110 and a second rod coupler 120. The first rod coupler is connected to the first rod 104 and the second rod coupler is connected to the second rod 106. The first and second rod couplers are configured to couple the rods to the lever 108. The rod couplers are also configured to allow the relative positions of the rods to be adjusted relative to the actuator 100. That is, the first vertical position and second vertical position of the first rod 104 relative to the actuator 100 may be adjusted by rotation of a first rod adjuster 112 of the first rod coupler 110. Similarly, the third vertical position and fourth vertical position of the second rod 106 may be adjusted by rotation of a second rod adjuster 122 of the second rod coupler. According to the embodiment of FIG. 1, the first rod adjuster and second rod adjuster may be configured as a bushing having a socket accessible via a tool in a direction perpendicular to a longitudinal axis of the first rod 104 and the second rod 106. Of course, in other embodiments, the rod adjuster may be configured as a screw, bolt, shaft, or any other suitable arrangement, as the present disclosure is not so limited. The first rod adjuster and second rod adjuster may be rotated to adjust the relative positioning of the first rod and second rod, respectively, while the actuator 100, first rod, and second rod are all at least partially disposed inside a door, as will be discussed further with reference to FIG. 10.

Figure 2:
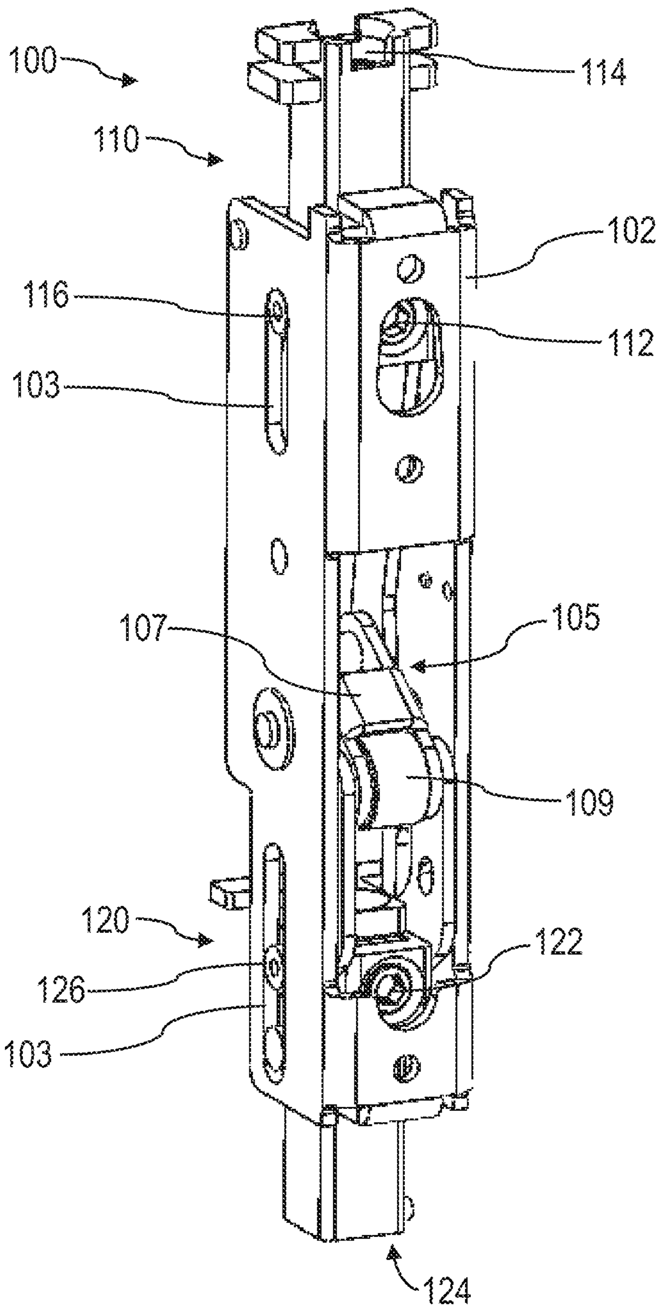
FIG. 2 is a perspective view of another embodiment of a multi-point latching device rod actuator.

FIG. 2 is a perspective view of an embodiment of a latching device rod actuator 100 with portions of the housing 102 and lever omitted for clarity. As shown in FIG. 2, the actuator 100 includes a first rod coupler 110 and a second rod coupler 120. The first rod coupler and second rod coupler are slidably disposed in a housing 102 of the actuator. In the particular embodiment of FIG. 2, the first rod coupler includes a guide 116 configured to slide within a slot 103 formed in the housing 102. Similarly, the second rod coupler 120 includes a guide 126 configured to slide within a second slot 103. Accordingly, the first and second rod couplers are constrained to movement along an axis (e.g., a vertical axis). In some embodiments as shown in FIG. 2, the first rod coupler 110 and second rod coupler 120 may be coupled to a transmission 105 that is configured to convert rotational motion of a lever (for example, see FIG. 1) into translational motion of the first rod coupler and the second rod coupler.

In the particular embodiment of FIG. 2, the transmission includes a coupling 107 having a camming surface 109 that is configured to engage an end of a lever (for example, see FIG. 1). As the lever is rotated from a first rotational position to a second rotational position (e.g., by depressing a push bar), the coupling 107 may be rotated about a pin. A first end of the coupling 107 including the camming surface 109 may be linked to the second rod coupler 120, and a second, opposite end of the coupling may be linked to the first rod coupler 110. Accordingly, in response to rotation of the coupling 107, the first rod coupler 110 and the second rod coupler 120 may be moved in opposite directions. The first rod coupler and second rod coupler may be linked to the coupling 107 at positions opposite a rotational axis of the coupling, such that rotation of the coupling moves the rod couplers in opposite directions. By constraining the first rod coupler 110 and second rod coupler 120 to move along an axis by the guides and slots, the coupling 107 transfers rotational motion of the coupling 107 into translational motion of the rod couplers. Accordingly, when rods are engaged with the rod couplers, the rods may be moved translationally by the actuator 100.

In some embodiments as shown in FIG. 2, the first rod coupler 110 includes an opening 114 on a first end of the rod coupler configured to receive a rod. As will be discussed further with reference to the embodiment of FIGS. 3A-3B, the opening 114 may provide access to an internal volume of the first rod coupler. The internal volume may include a first rod receptacle having internal threads configured to threadedly engage a rod. As shown in FIG. 2, the first rod coupler also includes a rod adjuster 112. As will be discussed further with reference to the embodiment of FIGS. 3A-3B, rotation of the rod adjuster 112 rotates the first rod receptacle within the internal volume of the first rod coupler. The rod receptacle may include the internal threads threadedly engaged with a rod (for example, see FIGS. 3A and 4B), so that rotation of the rod adjuster threads or unthreads the rod relative to the first rod coupler. In this manner, rotation of the rod adjuster may change the position of a rod relative to the actuator 100.

Figure 10:
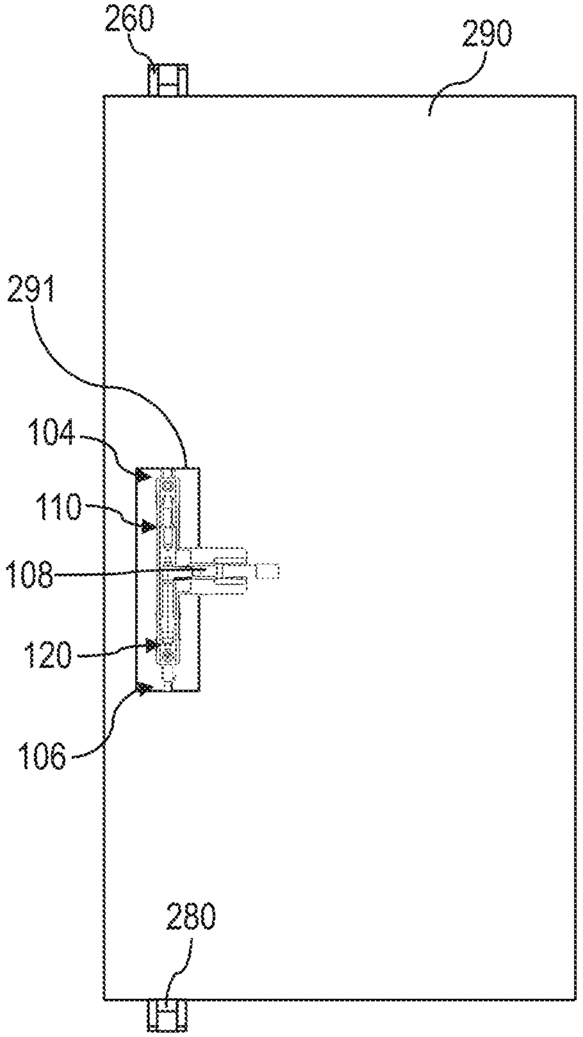
FIG. 10 is a side view of one embodiment of a door including a latching device according to exemplary embodiments described herein.

As shown in FIG. 2, the rod adjuster 112 may be configured to receive a hex key and may be accessible to a user when the actuator 100 is installed in a door (for example, see FIG. 10). In some embodiments as shown in FIG. 2, the second rod coupler 120 is configured similarly to the first rod coupler 110. In this regard, the second rod coupler 120 includes an opening 124 to an internal volume of the second rod coupler, where the internal volume includes a second rod receptacle having internal threads configured to threadedly engage a rod. The second rod coupler also includes a rod adjuster 122 configured to rotate a rod receptacle having the internal threads to thread or unthread a rod from the second rod coupler. Accordingly, the rod adjuster 122 allows a user to adjust a position of a second rod relative to the actuator 100 via rotation of the rod adjuster. An exemplary arrangement of a second rod coupler 120 is described further with reference to the embodiment of FIG. 4A.

Figure 3A:
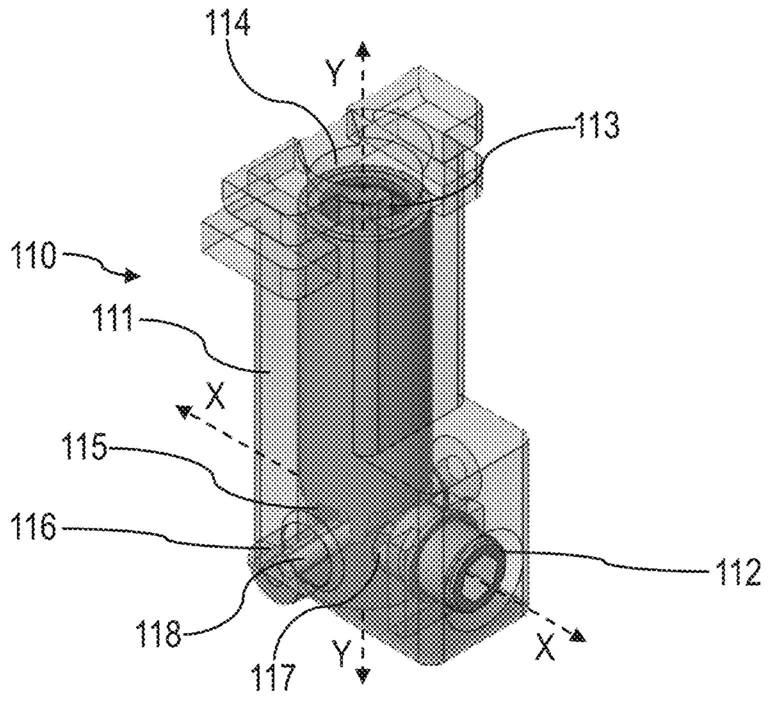
FIG. 3A is a first perspective view of one embodiment of a vertical rod coupler.
Figure 3B:
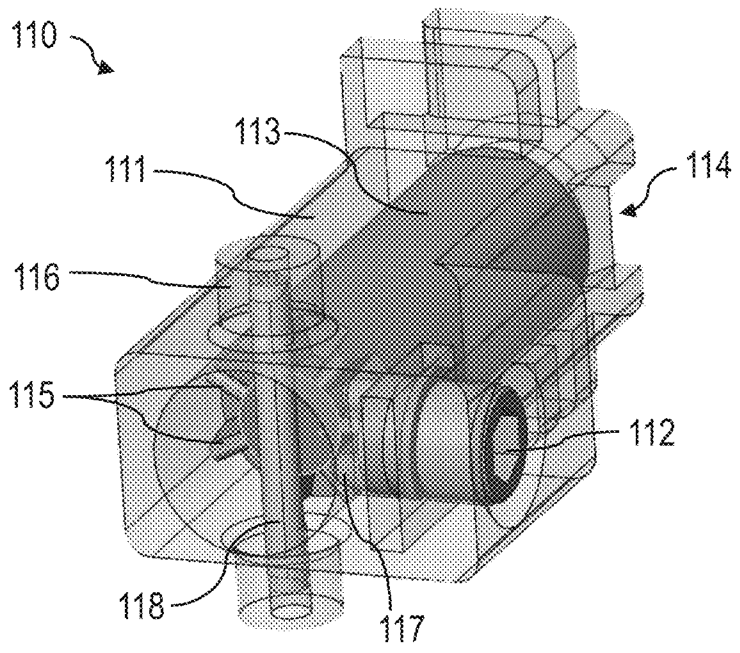
FIG. 3B is a second perspective view of the vertical rod coupler of FIG. 3A.

FIGS. 3A-3B depict alternative perspective views of one embodiment of a rod coupler 110. In some embodiments, the rod coupler of FIGS. 3A-3B may be configured to support an upper vertical rod (e.g., a rod positioned vertically above an actuator and configured to actuate a transom latch). As shown in FIGS. 3A-3B, the rod coupler includes a housing 111 having an internal volume configured to rotatably support a rod adjuster 112 and a rod receptacle 113. According to the embodiment of FIGS. 3A-3B, the rod adjuster is configured to rotate about a rod adjuster axis X (e.g., a first axis) and the rod receptacle 113 is configured to rotate about a rod receptacle axis Y (e.g., a second axis) inside of the internal volume of the housing 111. As shown in FIGS. 3A-3B, the axis X and axis Y are different, and in the particular embodiment of FIGS. 3A-3B are perpendicular to one another. In other embodiments, a rod adjuster and rod receptacle may rotate about any suitable axes that may be transverse to one another, as the present disclosure is not so limited. In some embodiments as shown in FIGS. 3A-3B, the rod receptacle 113 and rod adjuster 112 may be configured as bushings configured to rotate while in contact with the rod coupler housing 111. In some embodiments as shown in FIGS. 3A-3B, the rod receptacle may be retained in the housing 111 by a pin 118. The pin 118 of FIGS. 3A-3B is configured as a spring pin that extends across an internal volume of the housing 111 to retain the rod receptacle in the housing. The rod receptacle 113 abuts the pin 118 and rotates while supported by the pin 118. In the particular embodiment of FIGS. 3A-3B, the pin 118 is supported in a guide 116 of the rod coupler 110. The guide 116 may be configured to engage a slot of an actuator housing to constrain movement of the rod coupler to translation along an axis. In other embodiments, a rod coupler may employ any suitable arrangement to retain a rod receptacle in a housing and allow rotation of the rod receptacle, including bearings, as the present disclosure is not so limited.

As shown in FIGS. 3A-3B, the rod receptacle includes internal threads aligned with an opening 114 formed in the housing 111. The rod receptacle 113 is configured to receive a threaded end of a rod such that the rod threadedly engages the rod receptacle through the opening 114. As shown in FIGS. 3A-3B, the rod receptacle 113 includes a plurality of rod receptacle gear teeth 115 positioned on an end of the rod receptacle opposite the opening 114. The rod adjuster 112 includes a plurality of rod adjuster gear teeth 117 that mesh with the plurality of rod receptacle gear teeth 115. Accordingly, the rod adjuster 112 and rod receptacle 113 are operatively coupled, such that rotation of the rod adjuster rotates the rod receptacle and rotation of the rod receptacle rotates the rod adjuster. According to the embodiment of FIGS. 3A-3B, the rod adjuster includes a socket configured to receive a hex key that allows a user to rotate the rod adjuster about the axis X. When the rod adjuster rotates, the rod receptacle 113 is correspondingly rotated about the axis Y. As a result, a rod threadedly engaged with the rod receptacle may be threaded or unthreaded from the rod receptacle. This threading or unthreading of the rod may change the position of the rod relative to the rod coupler 110 and an actuator in which the rod coupler is employed. In some embodiments, the axis X may be parallel to a horizontal axis, and the axis Y may be parallel to a vertical axis.

Figure 4A:
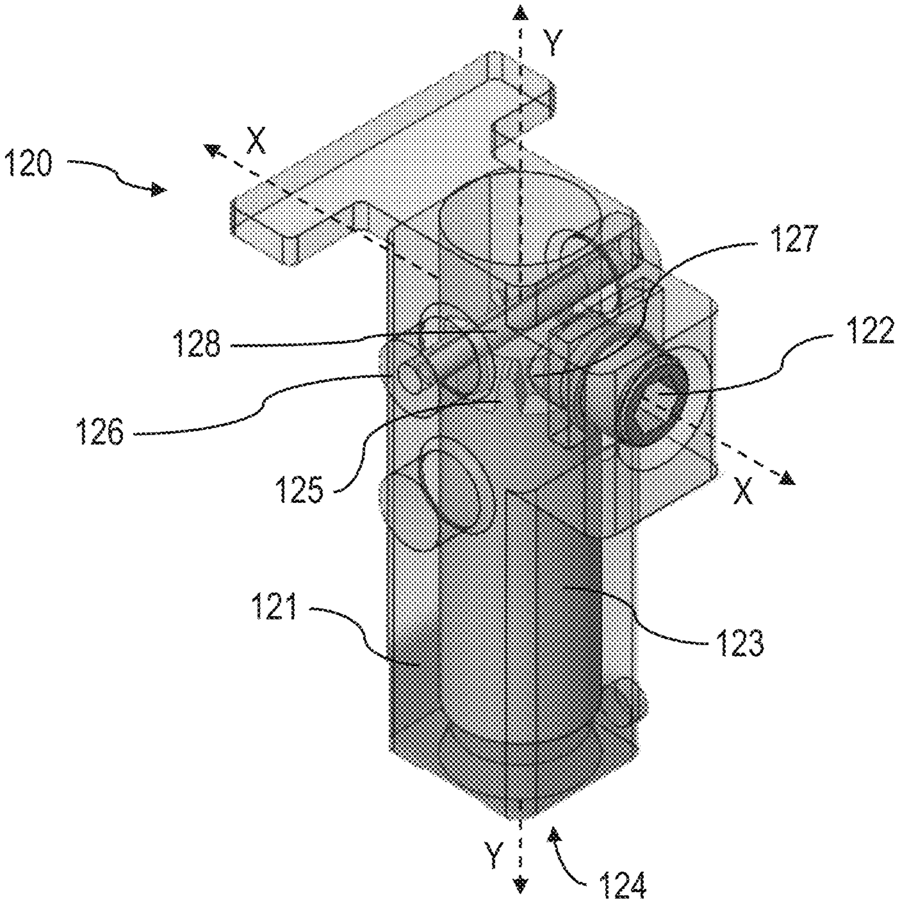
FIG. 4A is a perspective view of another embodiment of a vertical rod coupler.
Figure 4B:
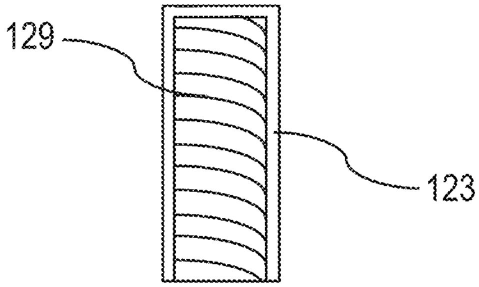
FIG. 4B is a cross-sectional schematic of one embodiment of a rod receptacle of the vertical rod coupler of FIG. 4A.

FIG. 4A is a perspective view of another embodiment of a rod coupler 120. In some embodiments, the rod coupler of FIG. 4A may be configured to support a bottom vertical rod (e.g., a rod positioned vertically below an actuator and configured to actuate a bottom latch).

As shown in FIG. 4A and similar to the embodiment of FIGS. 3A-3B, the rod coupler includes a housing 121 configured to rotatably support a rod adjuster 122 and a rod receptacle 123. The rod adjuster is configured to rotate about a rod adjuster axis X (e.g., a first axis) and the rod receptacle is configured to rotate about a rod receptacle axis Y (e.g., a second axis). In some embodiments as shown in FIG. 4A, the axis X and axis Y are perpendicular to one another. In some embodiments, the axis X may be parallel to a horizontal axis and the axis Y may be parallel to a vertical axis. In the embodiment of FIG. 4A, the rod receptacle 123 and rod adjuster 122 are configured as bushings configured to rotate within an internal volume of the housing 121 while in contact with the housing. In other embodiments one or more bearings may be employed to support the rod receptacle and/or rod adjuster, as the present disclosure is not so limited.

Similar to the embodiment of FIGS. 3A-3B, in the embodiment of FIG. 4A, the rod receptacle is retained in the internal volume of the housing 121 by a pin 128 configured as a spring pin. The pin is retained inside of a guide 126 configured to constrain the rod coupler 120 to translational movement along an axis when the guide is engaged with a slot of an actuator. In other embodiments any suitable retaining element may be employed to retain the rod receptacle in the housing 121, as the present disclosure is not so limited.

According to the embodiment of FIG. 4A, the rod receptacle 123 includes internal threads similar to those shown in FIGS. 3A-3B. As shown in the cross-sectional schematic of FIG. 4B, the internal threads 129 are accessible through an opening 124 formed in the housing 121.

The rod receptacle also includes a plurality of rod receptacle gear teeth 125 disposed on an end of the rod receptacle opposite the opening 124. The rod adjuster 122 includes a plurality of rod adjuster gear teeth 127 configured to engage the plurality of rod receptacle gear teeth 125. Accordingly, rotation of the rod adjuster 122 about the axis X rotates the rod receptacle about the axis Y. In this manner, the rod receptacle 123 and rod adjuster 122 transfer rotational motion between the axis X and axis Y. In other embodiments, any suitable gear arrangement may be employed, including bevel gears, as the present disclosure is not so limited.

According to the embodiment of FIG. 4A, a rod threadedly engaged with the rod receptacle 123 may be configured to be threaded or unthreaded and correspondingly moved relative to the rod coupler via rotation of the rod adjuster 122. For example, the rod adjuster 122 may receive a hex key configured to allow a user to apply torque to the rod adjuster. In other embodiments, a rod adjuster may include any suitable head having any suitable drive profile or socket (e.g., Phillips head, flathead, hexalobular internal, or any other suitable drive profile) so that any suitable tool may be employed by a user, as the present disclosure is not so limited.

In some embodiments, a latching device may include an auxiliary interface that may be positioned on an exterior (e.g., unsecure) side of the door. For example, an auxiliary interface may include a keyhole, keypad, and/or lock cylinder, so that an authorized user may operate the latching device from an exterior side of the door. This auxiliary interface may be coupled to an actuator of the latching device with an auxiliary rod, so that operation of the auxiliary interface operates the actuator.

Figure 5:
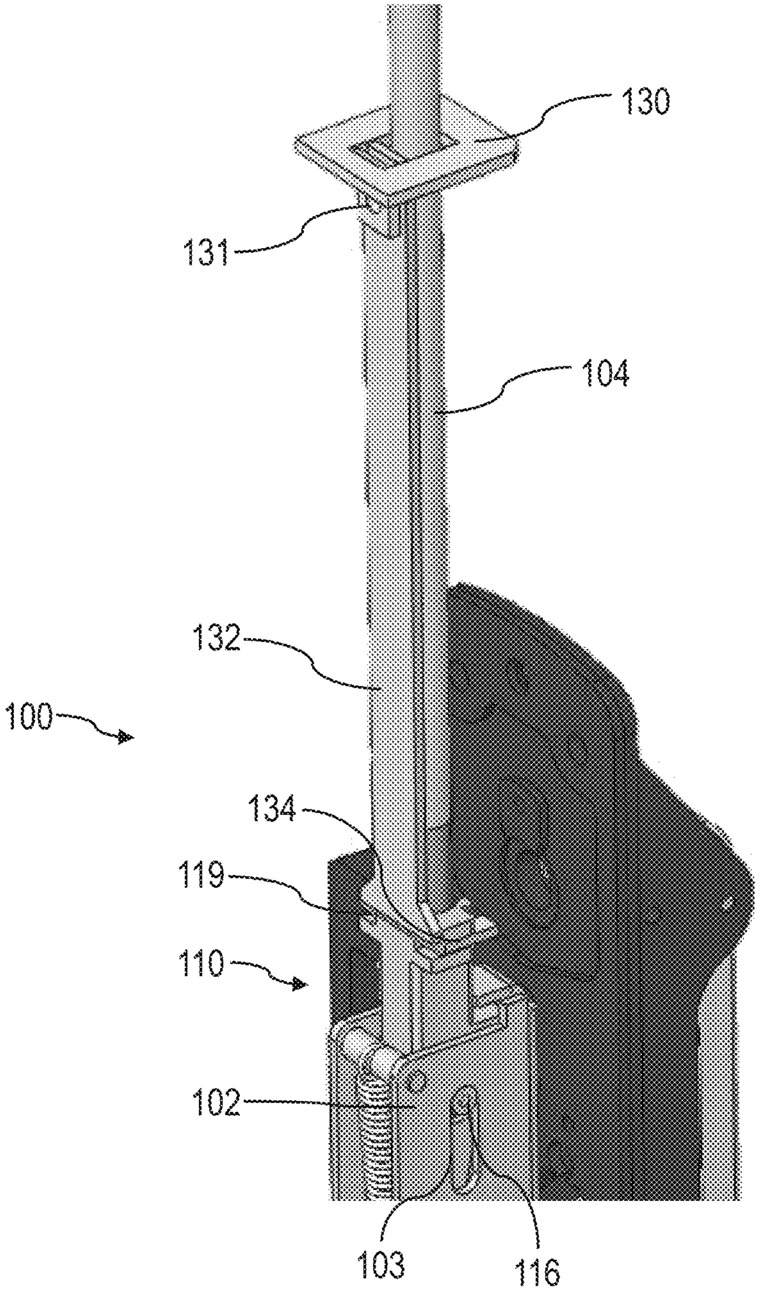
FIG. 5 is a perspective view of one embodiment of an auxiliary adapter rod.

FIG. 5 is a perspective view of one embodiment of an auxiliary adapter rod 132 in use with an actuator 100 of a latching device. As shown in FIG. 5, an upper portion of the actuator 100 is shown. The actuator 100 includes a housing 102 and a rod coupler 110 slidably disposed in the housing. In the embodiment of FIG. 5, the rod coupler 110 is constrained to translate along an axis by a guide 116 disposed in a slot 103 formed in the housing 102. The rod coupler 110 is engaged with a rod 104 which may be coupled to a transom latch and configured to move the transom latch between an extended position and a retracted position.

As shown in FIG. 5, the latching device includes an auxiliary plate 130 which may function as a coupling between an auxiliary interface and the actuator 100. As shown in FIG. 5, the auxiliary plate 130 is coupled to the auxiliary adapter rod 132 with a fastener 131 (e.g., screw, rivet, etc.). In the embodiment of FIG. 5, the rod coupler 110 includes a slot 119 configured to receive a flange 134 of the auxiliary adapter rod 132. Accordingly, the flange and slot form a connection between the rod coupler 110 and the auxiliary rod 132 so that force may be transmitted between the auxiliary rod and the rod coupler. In other embodiments, any suitable coupling between the auxiliary rod and rod coupler may be employed, as the present disclosure is not so limited. As the auxiliary rod is able to transmit force to the rod coupler, the auxiliary interface may be employed by a user to apply force to the auxiliary plate 130, which in turn is transmitted to the actuator 100 via the auxiliary adapter rod 132 and the rod coupler 110 to actuate the actuator 100 to an actuated state. As will be discussed further with reference to FIG. 6, the arrangement of FIG. 5 allows auxiliary rods of a predetermined length to be quickly swapped out in a latching device to accommodate various auxiliary interfaces that may be located at different vertical heights relative to the actuator 100.

Figure 6:
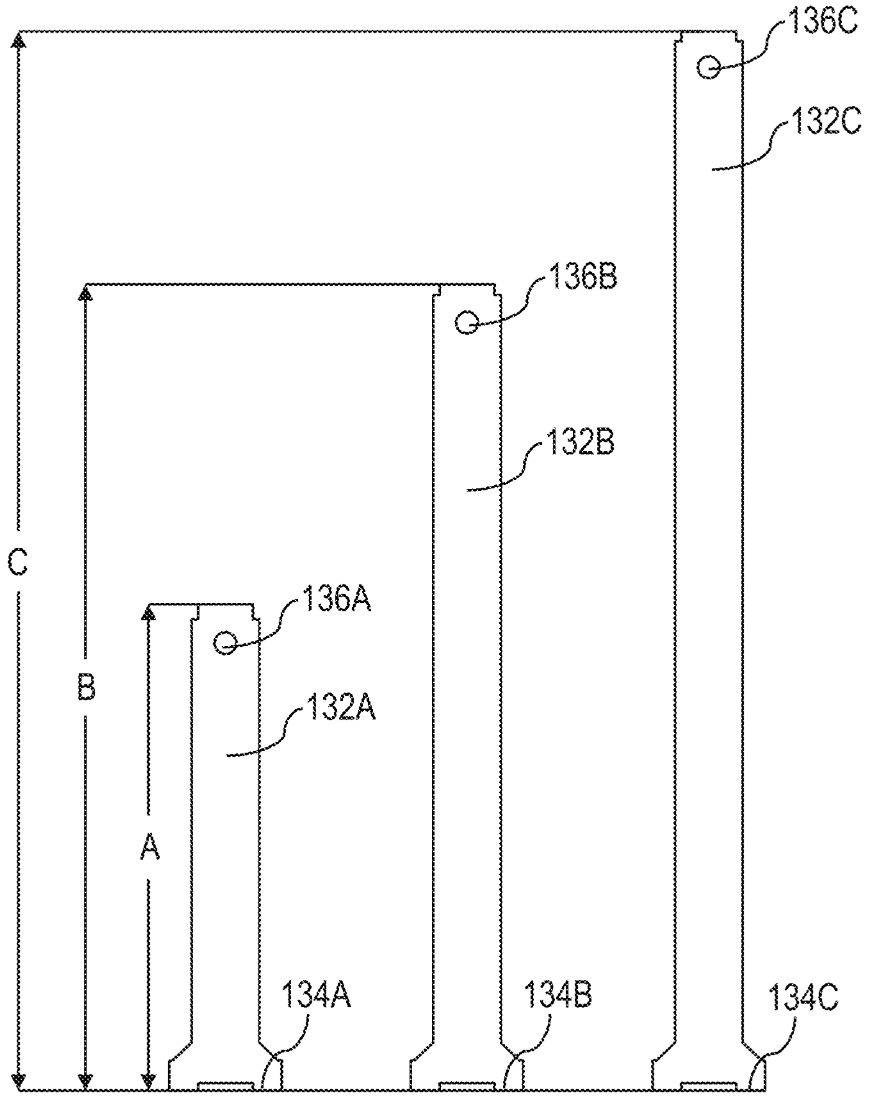
FIG. 6 is a side schematic of a plurality of auxiliary adapter rods according to some exemplary embodiments.

FIG. 6 is a side schematic of a plurality of auxiliary adapters according to some exemplary embodiments. As noted previously, auxiliary interface devices may be positioned at a variety of heights across different door installations depending on a particular trim installed or type of door. Accordingly, the inventors have appreciated easily swappable auxiliary rods that allow a variety of auxiliary interface devices to operate with an actuator including rod couplers according to exemplary embodiments described herein. The auxiliary rods may have predetermined heights that match a spacing between a given auxiliary interface device and a rod coupler.

As shown in FIG. 6, a set of three auxiliary rods are shown: a first auxiliary adapter rod 132A, a second auxiliary adapter rod 132B, and a third auxiliary adapter rod 132C.

Each of the three auxiliary rods includes a hole 136A, 136B, 136C configured to receive a fastener, such as a bolt or rivet, so that the auxiliary rod may be connected to an auxiliary plate (for example, see FIG. 5) or to an auxiliary interface. The auxiliary rods also include a flange 134A, 134B, 134C configured to engage a slot of a rod coupler. However, the overall length of each auxiliary rod is different. As shown in FIG. 6, the first auxiliary adapter rod 132 has a height A, the second auxiliary rod has a height B, and the third auxiliary rod has a height C, where C>B>A. Accordingly, a specific height of auxiliary rod may be selected during installation of a latching device based on a particular auxiliary interface device employed with the latching device. As the auxiliary device is coupled to an actuator through the auxiliary rod instead of an adjustable vertical rod, the auxiliary rod may require no adjustment when installed.

In some circumstances, it may be desirable to prevent the rod from being completely unthreaded from a rod coupler. In some cases, if a bottom vertical rod is unthreaded completely from a rod coupler, the bottom rod may fall under its own weight away from the rod coupler so that the bottom rod is no longer able to engage the threads of the bottom rod coupler without being manually reset (e.g., lifted) by a user. Accordingly, the inventors have appreciated the benefits of a stop for a bottom latch configured to prevent the bottom rod from disengaging with a rod coupler. FIGS. 7A-8B depict alternative exemplary embodiments of such an arrangement.

Figure 7A:
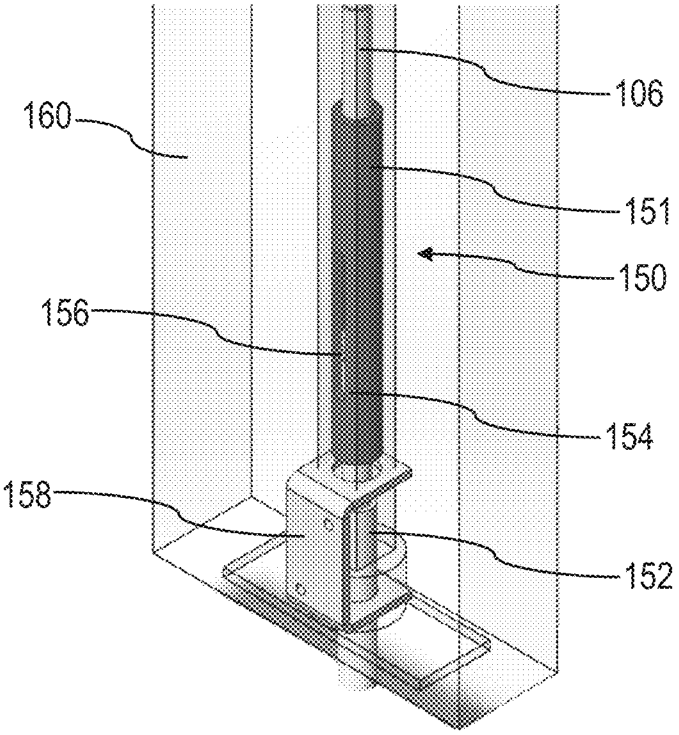
FIG. 7A is a perspective view of one embodiment of a bottom latch and a bottom bracket.
Figure 7B:
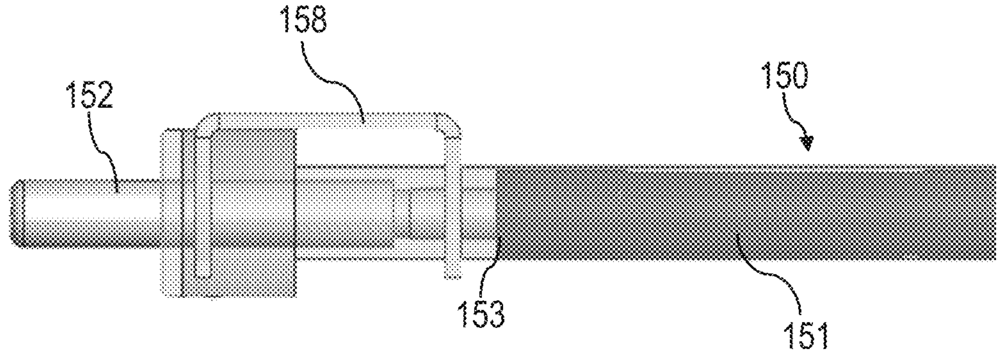
FIG. 7B is a side view of the bottom latch and bottom bracket of FIG. 7A.

FIG. 7A is a perspective view and FIG. 7B is a side view of one embodiment of a bottom latch 150 and a bottom bracket 158. As shown in FIG. 7A, the bottom latch 150 includes a latch head 152 which moves independent from a bottom latch housing 151. The latch housing is rigidly connected to a bottom rod 106, which may be coupled to an actuator via a rod coupler. The latch head 152 is coupled to a latch head guide 156 disposed in a slot 154 formed in the bottom latch housing 151, so that the latch head 152 may translate relative to the bottom latch housing 151. In some embodiments, the latch head 152 is biased toward an extended position relative to the bottom latch housing 151. The bottom rod 106 may be configured to move the bottom latch housing 151 and correspondingly the latch head 152 between an extended and retracted position. In the extended position as shown in FIG. 7A, the latch head 152 extends out of a door 160 to engage a corresponding latch head pocket disposed in a door threshold. When a corresponding actuator is actuated to an actuated state, the rod 106 may be moved upwards (e.g., into the door 160) to move the latch head 152 to a retracted position further inside of the door.

As shown in FIGS. 7A-7B, the bottom bracket 158 is disposed partially around the latch head 152 inside of the door 160. The bracket 158 is configured to allow movement of the latch head 152 between the extended position and retracted position. However, the bottom latch housing 151 includes a shoulder 153 which is sized and shaped so that the shoulder is not able to move through the bracket 158. Accordingly, movement of the bottom rod 106 (and correspondingly the bottom latch housing 151) is allowed to the extent that the shoulder 153 does not contact the bracket 158. If the shoulder 153 does contact the bracket 158, the bracket prevents further movement of the rod 106 in a direction out of the door 160. In this manner, even if the rod 106 is completely unthreaded and uncoupled from a rod coupler, the bracket 158 prevents the rod from falling out of the door 160. Accordingly, the rod 106 may be re-engaged by the rod coupler without reinserting the rod 106 into the door.

Figure 8A:
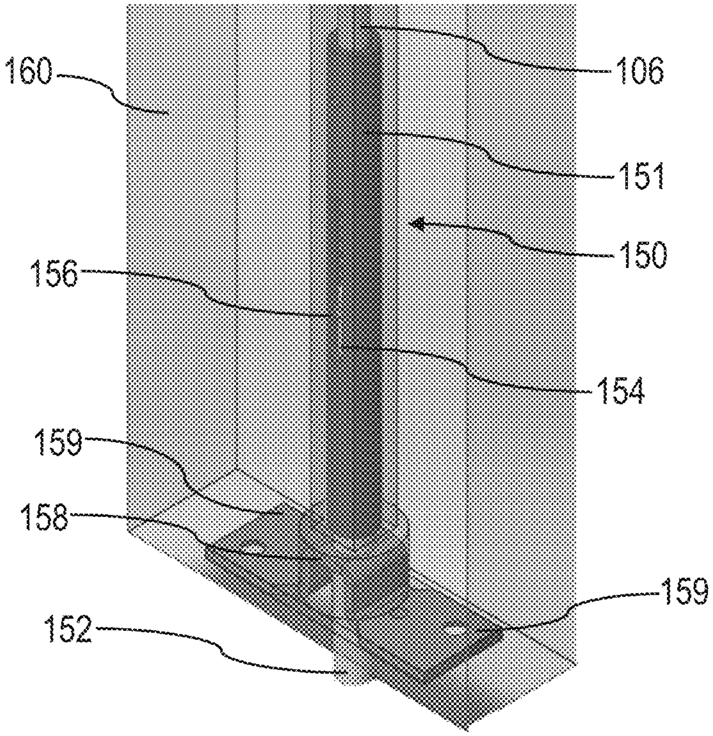
FIG. 8A is a perspective view of another embodiment of a bottom latch and a bottom bracket.
Figure 8B:
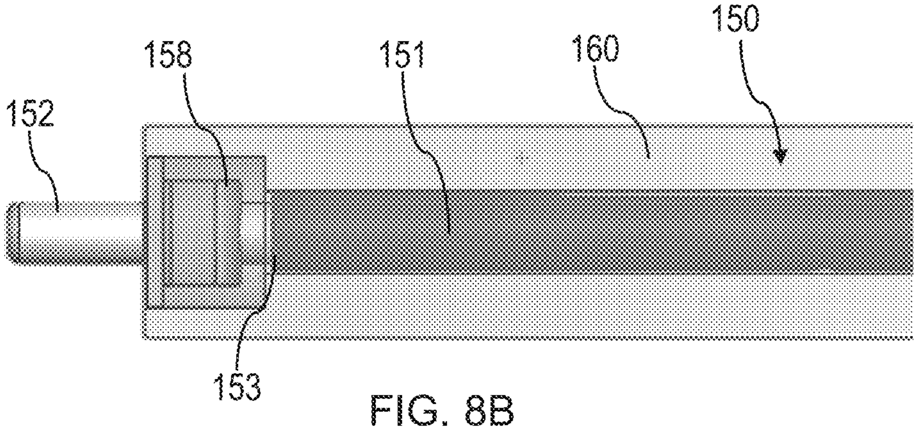
FIG. 8B is a side view of the bottom latch and bottom bracket of FIG. 8A.

FIG. 8A is a perspective view and FIG. 8B is a side view of another embodiment of a bottom latch 150 and a bottom bracket 158. The embodiment of FIGS. 8A-8B is similar to that of FIGS. 7A-7B. As shown in FIGS. 8A-8B, the bottom latch 150 includes a bottom latch housing 151 coupled to a bottom rod 106. The bottom rod may also be coupled to a rod coupler according to exemplary embodiments described herein. The bottom latch includes a bottom latch head 152 which is movable relative to the bottom latch housing 151. The bottom latch head 152 includes a latch head guide 156 disposed in a slot 154 formed in the bottom latch housing 151. Accordingly, the bottom latch head 152 is able to translate relative to the bottom latch housing 151. The bottom latch head 152 may be biased to an extended position relative to the bottom latch housing with a biasing member such as a compression spring. Of course, in other embodiments, the bottom latch head 152 may be connected to the bottom rod 106 so that the bottom latch is not able to move independently from the bottom rod, as the present disclosure is not so limited. The movement of the bottom rod 106 between a first vertical position and second vertical position may correspondingly move the bottom latch head 152 between a retracted position (when the latch head is recessed in a door 160) and an extended position (where the latch head is extended from the door 160).

As shown in FIGS. 8A-8B, the bottom bracket 158 functions to prevent the bottom rod 106 from falling out of the door 160. As shown in FIG. 8A, the bracket 158 includes two flanges 159 that may allow the bracket to be fastened to the door 160 with one or more fasteners (e.g., screws). Like the embodiment of FIGS. 7A-7B, the bracket 158 is configured to engage a shoulder 153 of the bottom latch housing 151 to prevent further movement of the bottom rod 106 out of the door 160. In this manner, if the rod 106 is inadvertently decoupled from a rod coupler, the rod 106 is prevented from falling out of the door by the bracket 158. Accordingly, a rod coupler may re-engage the rod without manually resetting the bottom rod 106.

Figure 9:
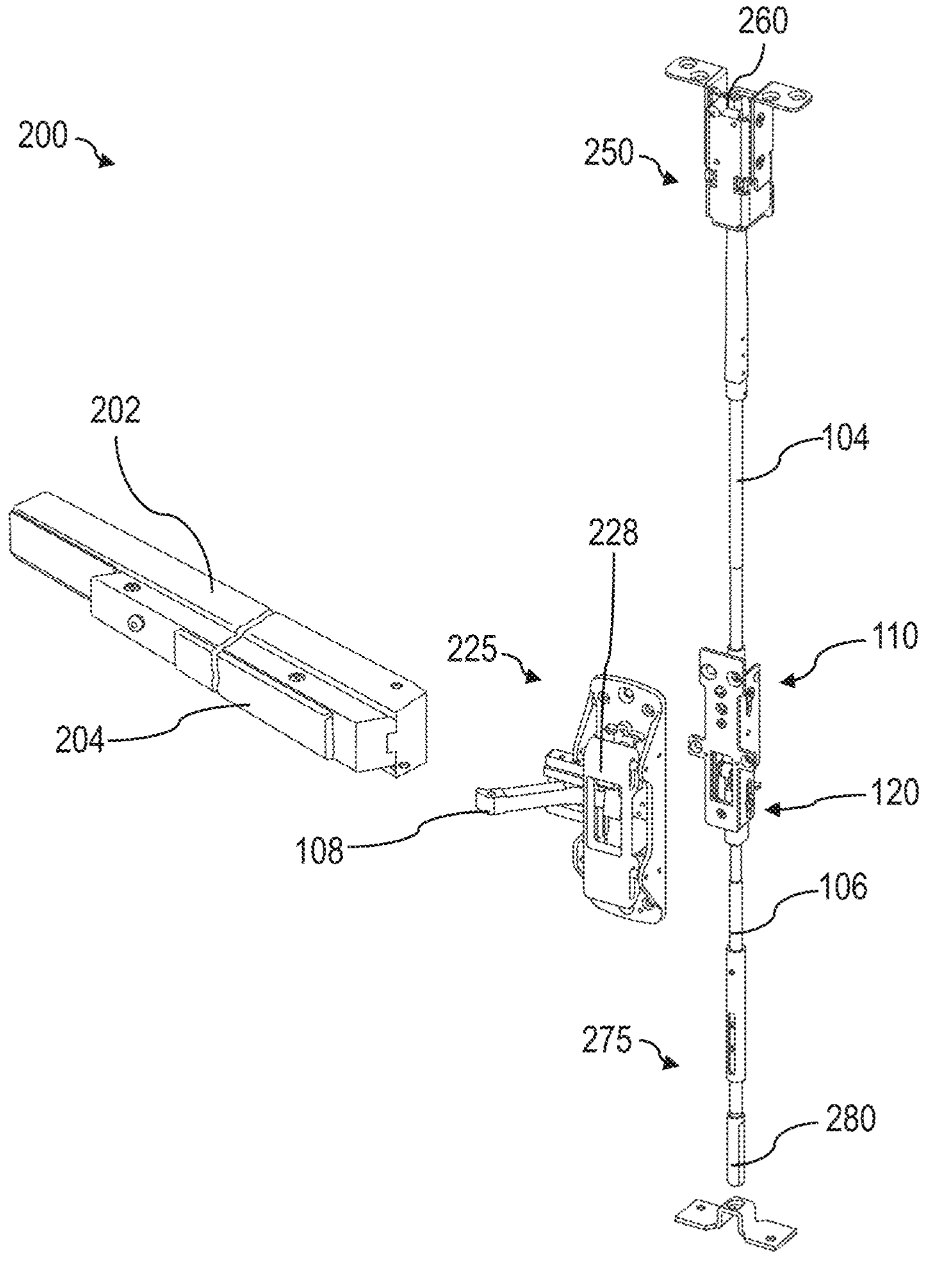
FIG. 9 is an exploded view of an embodiment of a multi-point latching device.

FIG. 9 is an exploded view of an embodiment of a multi-point latching device 200 including a transom latch 250 and a bottom latch 275. According to the embodiment of FIG. 9, the multi-point latching device is configured to be used with an exit device which includes a rail 202 and a push bar 204. The push bar may be used to manipulate a lever 108 of an actuator 225 which in turn moves multiple rod couplers 110, 120 between vertical positions. The lever 108 interacts with a transmission 228 to correspondingly move a first rod coupler 110 and second rod coupler 120 to reciprocate a first vertical rod 104 and a second vertical rod 106, respectively. The first and second vertical rods in turn move a transom latch head 260 of the transom latch 250 as well as a bottom latch head 280 of the bottom latch 275 between engaged and disengaged positions to correspond to a position of the lever 108 (e.g., between a first rotational position corresponding to an actuated state and a second rotational position corresponding to an unactuated state).

The multi-point latching device of FIG. 9 may employ vertical rod couplers (see FIGS. 3A-4B) which couple the first vertical rod 104 and second vertical rod 106 to the lever 108. These vertical rod couplers may allow the relative positions of the first and second vertical rods to be adjusted relative to the rod actuator and/or lever so that the multi-point latching device may be easily configured for any door, as discussed previously and further with reference to FIG. 10.

FIG. 10 is a side view of one embodiment of a door 290 including a multi-point latching device according to exemplary embodiments described herein showing how the latching device may be adjusted while already installed in the door. As shown in FIG. 10, the latching device is similar to that of FIG. 1. The latching device includes a first rod 104 coupled to a transom latch head 260 and a second rod coupled to a bottom latch head 280. The first rod 104 is configured to move the transom latch head 260 between an extended position and retracted position. The second rod 106 is similarly configured to move the bottom latch head 280 between an extended position and retraced position.

The latching device includes a lever 108 configured to be engaged by a push bar that may be depressed to actuate the actuator from an unactuated state to an actuated state. The lever 108 is connected to a first rod coupler 110 and a second rod coupler 120. The first rod coupler and second rod coupler may be threadedly connected to the first rod 104 and second rod 106, respectively.

As shown in FIG. 10, the first rod coupler 110 and second rod coupler 120 are accessible through an opening 291 formed in the door 290. Accordingly, while the first rod 104 and second rod 106 are almost completely concealed within the door 290, the first rod coupler and second rod coupler are accessible to a user at a location near the lever 108. In particular, a rod adjuster may be rotated by a user with a tool (e.g., a hex key, screwdriver, etc.) through the opening 291 to adjust the position of the first rod 104 and second rod 106 relative to the first rod coupler 110 and second rod coupler 120, respectively, as discussed with reference to other exemplary embodiments described herein.

Figure 11:
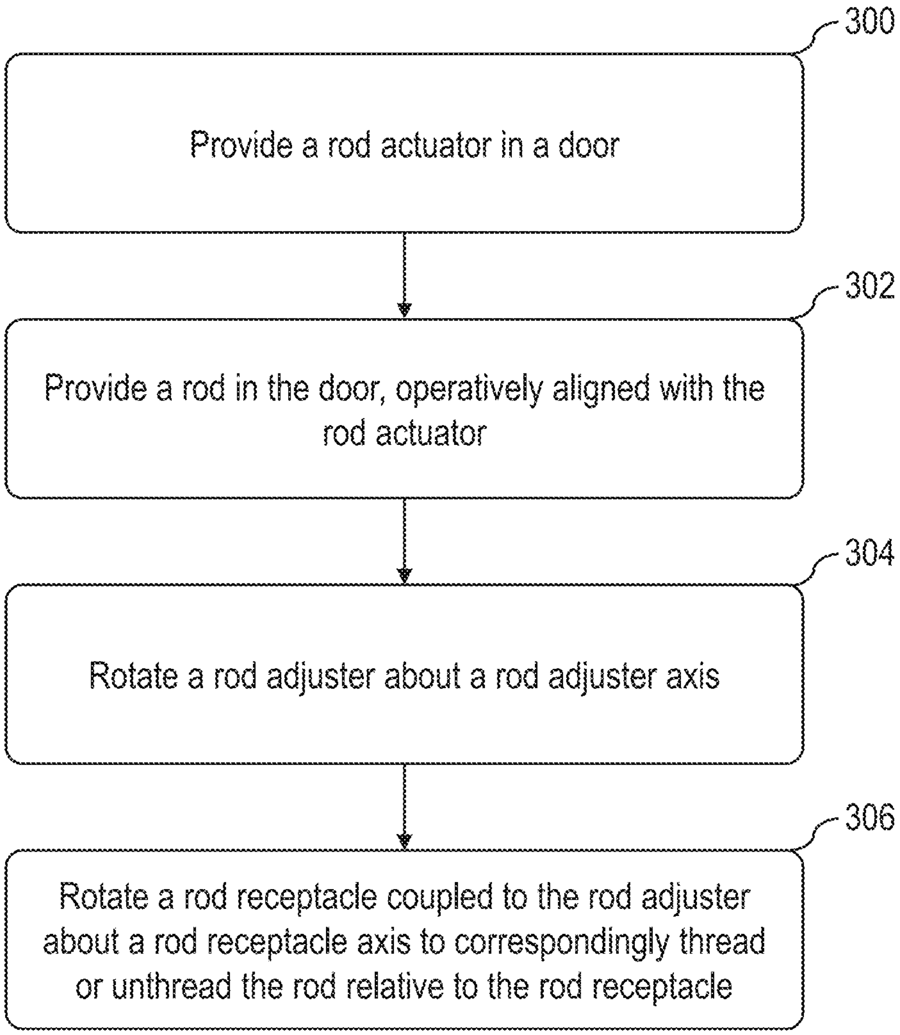
FIG. 11 is a flow chart for one embodiment of a method of installing a latching device.

FIG. 11 is a flow chart for one embodiment of a method of installing a latching device. In block 300, a rod actuator is provided in a door. In some embodiments, the rod actuator may include a lever configured to engage a push bar, and one or more rod couplers. Rotation of the lever may be converted by a transmission of the actuator into translational motion of the one or more rod couplers.

In block 302, a rod is provided in the door, and the rod may be operatively aligned with the rod actuator. For example, the rod may include a threaded end which may be engaged with internal threads of a rod coupler. In particular, the rod may be threadedly engaged with a rotatable rod receptacle of the rod coupler, so that the rod may be threaded or unthreaded from the rod coupler when the rod receptacle rotates.

In block 304, a rod adjuster is rotated about a rod adjuster axis. In some embodiments, a user may employ a drive tool configured to engage and rotate the rod adjuster.

In block 306, a rod receptacle coupled to the rod adjuster is rotated about a rod receptacle axis by the rotation of the rod adjuster. This rotation of the rod receptacle may thread or unthread the rod relative to the rod receptacle, thereby changing the relative spacing of the rod relative to the rod coupler. In this regard, threading the rod further into the rod coupler may move the rod closer to the rod coupler and the associated actuator. In contrast, unthreading the rod from the rod coupler may move the rod further away from the rod coupler and associated actuator.

In some embodiments, the rod receptacle and rod adjuster may include intermeshed gears configured to transfer rotational motion of the rod adjuster into rotational motion of the rod receptacle.

In some embodiments, the rod receptacle axis is a vertical axis, and the rod adjuster axis is transverse to the rod receptacle axis. In some embodiments, the rod adjuster axis is perpendicular to the rod receptacle axis.

In some embodiments, a rod adjuster may be rotated in a first direction to rotate the rod receptacle in a second direction to thread the rod into the rod coupler, and the rod adjuster may be rotated in a third direction to rotate the rod receptacle in a fourth direction to unthread the rod from the rod coupler.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a “user.” It should be appreciated that a “user” need not be a single individual, and that in some embodiments, actions attributable to a “user” may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A rod coupler comprising:

a rod;

a rod receptacle configured to rotate about a first axis, wherein the rod receptacle is configured to adjustably receive the rod, in an opening, wherein a proximal end of the rod is spirally threaded, and wherein the rod receptacle includes an internal thread configured to engage with the proximal end of the rod such that when the rod receptacle is rotated, the internal thread adjusts a linear position of the rod, and wherein the rod receptacle comprises a plurality of gear teeth disposed on an end of the rod receptacle opposite the opening;

a rod adjuster rotatably coupled to the rod receptacle and configured to rotate about a second axis; and a guide extending in a direction transverse to the rod and configured to slide along the first axis within a slot formed in a housing to constrain translational movement of the rod coupler along an axis, wherein rotation of the rod adjuster about the second axis is configured to rotate the rod receptacle about the first axis, wherein the first axis and the second axis are transverse to one another, and wherein the first axis and the second axis intersect one another.

2. The rod coupler of claim 1, further comprising a transmission operatively coupling the rod adjuster to the rod receptacle.

3. The rod coupler of claim 2, wherein the transmission includes the plurality of rod receptacle gear teeth provided on the rod receptacle, and wherein the transmission includes a plurality of rod adjuster gear teeth provided on the rod adjuster and configured to engage the plurality of rod receptacle gear teeth.

4. The rod coupler of claim 1, wherein the first axis and the second axis are perpendicular to one another.

5. The rod coupler of claim 1, wherein the rod adjuster includes a socket configured to receive a tool.

6. The rod coupler of claim 1, further comprising a rod coupler housing configured to rotatably support the rod receptacle and the rod adjuster.

7. The rod coupler of claim 6, wherein the rod receptacle is secured at least partially within the rod coupler housing by an internal pin.

8. The rod coupler of claim 7, wherein the rod receptacle is a bushing configured to contact the rod coupler housing when the rod receptacle rotates about the first axis.

9. The rod coupler of claim 1, wherein the rod receptacle has a first open end and a second closed end, wherein the first open end is configured to receive the rod, and wherein the second closed end is configured to engage with the rod adjuster.

10. A latching device comprising:

an actuator configured to actuate between an actuated state and an unactuated state;

a first rod including a threaded end; and a first rod coupler operatively coupled to the actuator and the first rod, the first rod coupler configured to transfer force between the actuator and the first rod, the first rod coupler comprising:

a rod receptacle configured to rotate about a first axis, wherein the rod receptacle is configured to at least partially adjustably receive the first rod in an opening, wherein a proximal end of the rod is spirally threaded, and wherein the rod receptacle includes an internal thread threadedly engaged with the threaded end of the first rod such that when the rod receptacle is rotated, the internal thread adjusts a linear position of the rod, and where in the rod receptacle comprises a plurality of gear teeth disposed on an end of the rod receptacle opposite the opening, and a rod adjuster rotatably coupled to the rod receptacle and configured to rotate about a second axis, wherein rotation of the rod adjuster about the second axis is configured to rotate the rod receptacle about the first axis, wherein the first axis and the second axis are transverse to one another, and wherein the first axis and the second axis intersect one another.

11. The latching device of claim 10, wherein the actuator is configured to move the first rod along the first axis between a first position and a second position when the actuator is actuated between the actuated state and the unactuated state.

12. The latching device of claim 11, wherein the first axis is a vertical axis when the latching device is installed in a door, and wherein the first position is a first vertical position and the second position is a second vertical position.

13. The latching device of claim 10, wherein the first rod coupler further comprises a transmission operatively coupling the rod adjuster to the rod receptacle.

14. The latching device of claim 13, wherein the transmission includes the plurality of rod receptacle gear teeth formed on the rod receptacle, and wherein the transmission includes a plurality of rod adjuster gear teeth formed on the rod adjuster and configured to engage the plurality of rod receptacle gear teeth.

15. The latching device of claim 10, wherein the first axis and the second axis are perpendicular to one another.

16. The latching device of claim 10, further comprising:

a second rod including a second threaded end; and a second rod coupler operatively coupled to the actuator and the second rod, the second rod coupler configured to transfer force between the actuator and the second rod, the second rod coupler comprising:

a second rod receptacle configured to rotate about the first axis, wherein the second rod receptacle is configured to at least partially receive the second rod, and wherein the second rod receptacle includes a second internal thread threadedly engaged with the second threaded end of the second rod, and a second rod adjuster rotatably coupled to the second rod receptacle and configured to rotate about the second axis, wherein rotation of the second rod adjuster about the second axis is configured to rotate the second rod receptacle about the first axis.

17. The latching device of claim 10, wherein the rod receptacle has a first open end and a second closed end, wherein the first open end is configured to receive the first rod, and wherein the second closed end is configured to engage with the rod adjuster.

18. A method of installing a latching device, the method comprising:

rotating a rod adjuster of a rod coupler about a rod adjuster axis in a first rotational direction to correspondingly rotate a rod receptacle of the rod coupler about a rod receptacle axis in a second rotational direction via a plurality of gear teeth disposed on an end of the rod receptacle opposite an opening, wherein the first rotational direction and second rotational direction are different, wherein the rod adjuster axis is transverse to the rod receptacle axis, and wherein the rod adjuster axis and the rod receptacle axis intersect one another;

threading a threaded end of a rod into the rod receptacle to linearly adjust the rod when the rod receptacle is rotated in the second rotational direction;

rotating the rod adjuster about the rod adjuster axis in a third rotational direction to correspondingly rotate the rod receptacle about the rod receptacle axis in a fourth rotational direction, wherein the third rotational direction and fourth rotational direction are different; and unthreading the threaded end of the rod from the rod receptacle when the rod receptacle is rotated in the fourth rotational direction.

19. The method of claim 18, wherein the rod adjuster axis is perpendicular to the rod receptacle axis.

20. The method of claim 18, wherein threading the rod into the rod receptacle moves the rod closer to an actuator operatively coupled to the rod receptacle.

21. The method of claim 20, further comprising actuating the actuator from an unactuated state to an actuated state to correspondingly move the rod between a first position and a second position.

22. The method of claim 21, wherein the first position is a first vertical position and the second position is a second vertical position.

23. The method of claim 18, wherein rotating the rod adjuster includes engaging the rod adjuster with a tool.

24. The method of claim 23, wherein the rod adjuster is accessible to the tool when the rod adjuster is positioned inside of a door.

25. The method of claim 18, wherein the rod receptacle has a first open end and a second closed end, wherein the first open end is configured to receive the rod, and wherein the second closed end is configured to engage with the rod adjuster.

* * * * *